United States Patent [19]

Brinegar

[11] 3,904,968

[45] Sept. 9, 1975

[54] THRESHOLD EXTENSION SWITCH

[75] Inventor: Billy M. Brinegar, Campbell, Tex.

[73] Assignee: Rockwell International Corporation, El Segundo, Calif.

[22] Filed: May 13, 1974

[21] Appl. No.: 469,208

[52] U.S. Cl. ................ 325/408; 325/399; 325/427; 325/474; 325/477; 325/480; 325/489

[51] Int. Cl.[2] ........................ H04B 1/16; H04B 1/10

[58] Field of Search ........... 325/395, 404, 408, 411, 325/427, 425, 473–480, 319, 399, 409, 489, 490; 178/DIG. 19

[56] References Cited

UNITED STATES PATENTS

| | | | |
|---|---|---|---|
| 2,273,680 | 2/1942 | Wiegerinck | 325/480 |
| 3,352,969 | 11/1967 | Konings | 178/DIG. 19 |
| 3,555,439 | 1/1971 | Starr et al. | 325/477 |
| 3,742,395 | 6/1973 | Yoneyama | 178/DIG. 19 |

*Primary Examiner*—Robert L. Griffin
*Assistant Examiner*—Robert Hearn
*Attorney, Agent, or Firm*—Bruce C. Lutz; Robert J. Crawford

[57] ABSTRACT

A signal sensitive switching circuit for allowing normal receiver operation when the received signal is greater than a predetermined amplitude and for inserting a narrow bandpass filter to reduce the effects of noise frequency signals when the received signal is less than the predetermined amplitude.

4 Claims, 3 Drawing Figures

THRESHOLD EXTENSION SWITCH

THE INVENTION

The present invention is generally concerned with electronics and more specifically concerned with radio receivers. Even more specifically the present invention is concerned with a method of extending the signal amplitude range of a receiver when the signal-to-noise ratio is so low that it is difficult to distinguish the signal.

There have been many attempts in the prior art to operate signal receivers under marginal conditions. The most normal method of attempting operation under marginal conditions is to use a threshold extender of the type which varies the bandwidth of the filters in the I.F. stages. In other words, the bandwidth of the I.F. stages is fairly broad under normal signal receiving conditions and is decreased in width as the signal amplitude received is lowered. The bandwidth of these filters is fairly broad under normal conditions in an attempt to maintain constant phase shift through the filters under varying frequency conditions. The constant phase characteristics are more difficult to achieve with narrower band filters. Thus, the extended threshold condition of the prior art receivers is an interim solution and normally results in very complex circuitry and further in circuitry which considerably increases the volume of space necessary to package the receiver.

The present inventive concept on the other hand inserts a narrow band filter into the receiver when it detects a low received signal amplitude. This detection is accomplished by checking the amplitude of the AGC signal which is used to vary the gain of the I.F. amplifiers. When this AGC signal decreases to a predetermined value, thereby signifying a low received signal at the antenna, the switch inserts the narrow band filter. Since the narrow band filter does have a signal delay, appropriate compensation must be inserted into the receiver under normal operating conditions. However, the compensating delay can be accomplished while maintaining the wide frequency band width by merely using a length of coaxial cable as illustrated in the present inventive concept.

It is, thus, an object of the present invention to provide an improved threshold extender.

Other objects and advantages of the present invention may be ascertained from a reading of the specification and appended claims in conjunction with the drawings wherein:

DETAILED DESCRIPTION OF THE FIGURES

Figure 1:
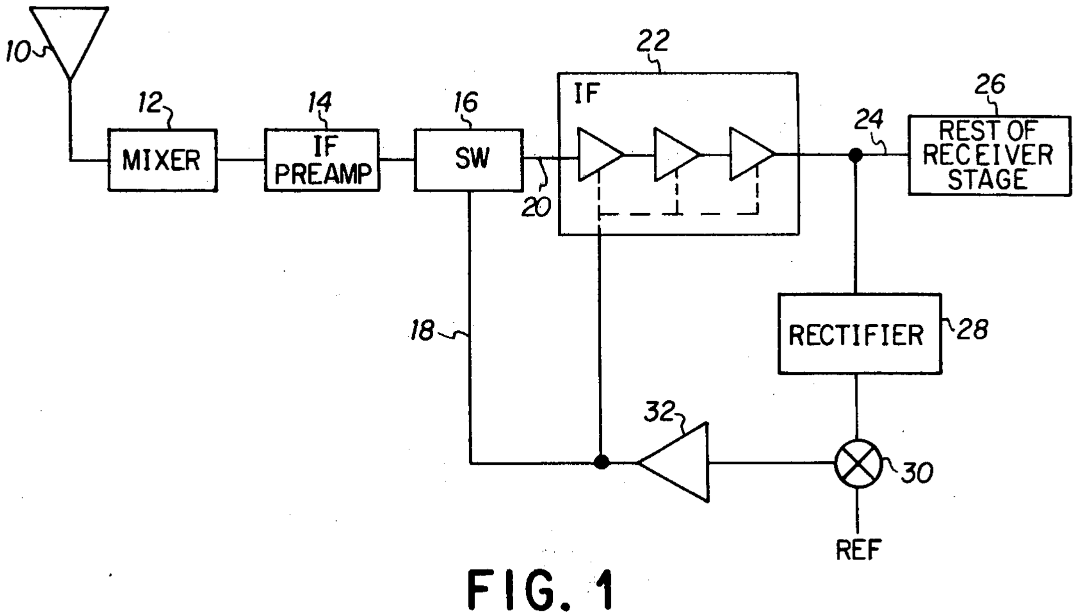
FIG. 1 is a block schematic diagram of a receiver incorporating the switch concept of the present invention.

In FIG. 1 an antenna 10 is shown connected to the input of a mixer state 12 whose output is connected through an intermediate frequency preamp 14 to a switch 16. Switch 16 receives a control input 18 and supplies an output of a lead 20 to an intermediate frequency block 22. Block 22 has an output 24 which is connected to the rest of the receiver circuitry 26 and also to a rectifier 28. The output of rectifier 28 is compared with a reference signal in a mixer 30 and the output thereof is supplied through an AGC amplifier 32 back to a control input of the I.F. amplifier 22 on lead 18. The amplifier 32 adjusts the gain of the amplifiers in the intermediate frequency block 22 and thereby maintains a substantially constant volume in the output of the receiver if the receiver happens to have an audio output. If it has a digital output, the amplitude of the digital pulses are maintained more nearly constant.

Figure 2:
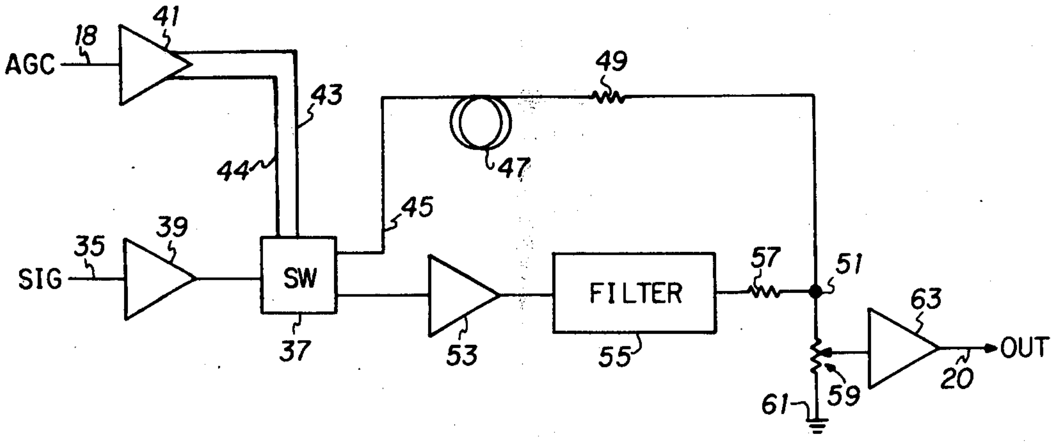
FIG. 2 is a block schematic diagram of the switch 16 illustrated in FIG. 1.

As previously mentioned, FIG. 2 illustrates in more detail the contents of switch 16 in FIG. 1. As illustrated, a signal is received on lead 35 from the preamplifier 14 and applied to a switching circuit 37 after passing through an isolation amplifier 39. The AGC signal is detected as to amplitude by an amplitude detecting circuit or voltage sensitive switching amplifier 41 which provides control output signals on leads 43 and 44 to switch 37. When the AGC signal drops below a predetermined level the control signal is applied to lead 44. When a control signal is received by switch 37 on 43, the input is connected to an output lead 45 which is further connected through a coil of coaxial cable 47 and a resistor 49 to a junction point 51. When a control signal is received on lead 44 the switch 37 instead passes the signal received from amplifier 39 through an amplifier 53 and a narrow bandpass filter 55 and further through a resistor 57 to junction point 51. A potentiometer generally designated as 59 is connected between junction point 51 and ground 61 and has a wiper connected to an isolation amplifier 63 whose output is connected to output terminal 20 thereby supplying the signal to I.F. amplifier 22.

Figure 3:
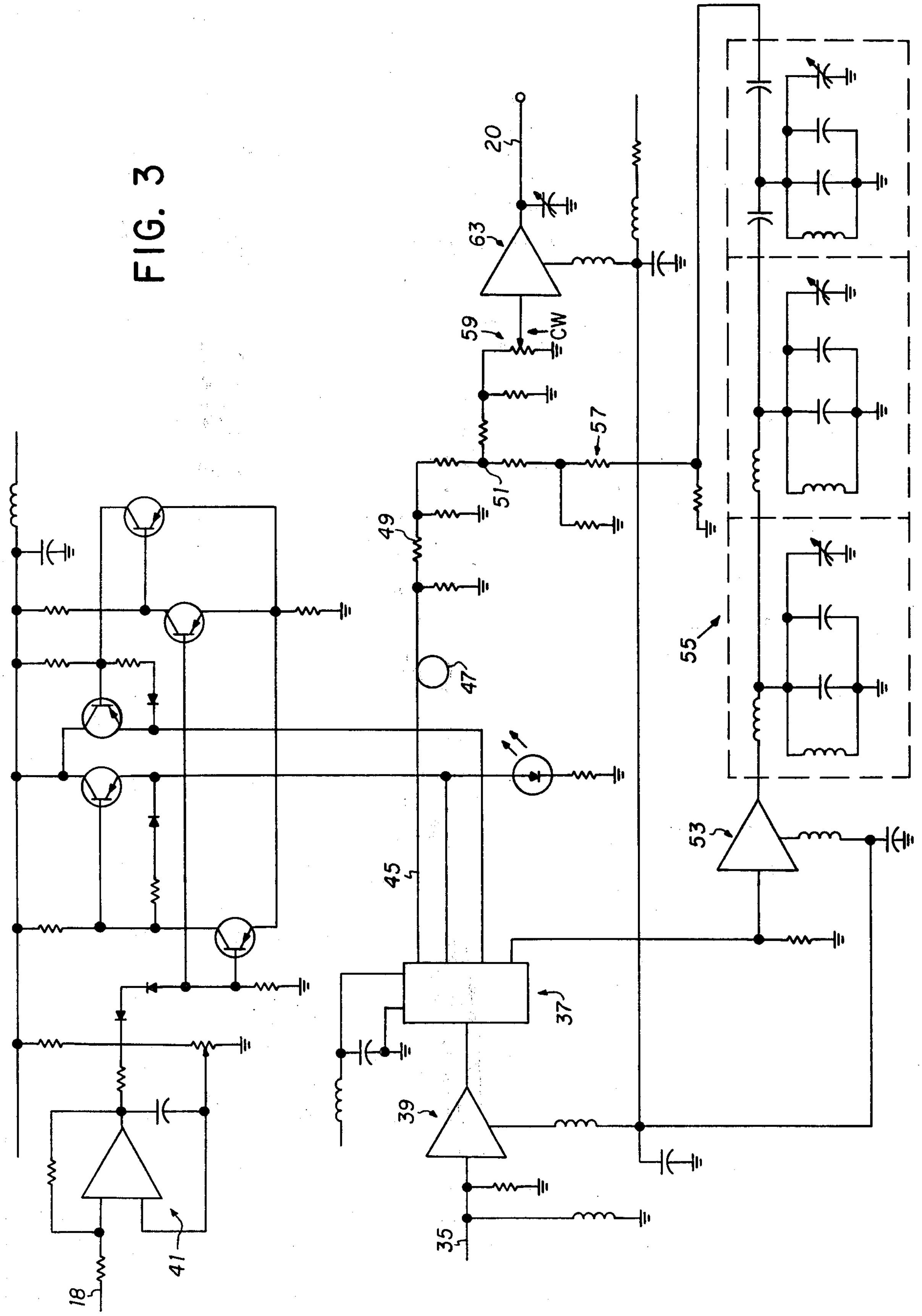
FIG. 3 is a detailed schematic of the switch of FIG. 2.

The same numbers used in illustrating FIG. 2 have been provided in FIG. 3 and in view of the detailed schematic diagram, it is believed that very little further explanation is required. The circuitry immediately to the right of amplifier 41 is the amplitude sensitive circuitry for operating the switch 37. The loop illustrated as 47 in one embodiment of the invention comprises a length of coaxial cable of 142 feet. The amplifiers 39, 41, 53, and 63 are all standardized operational amplifiers with amplifier 41 being a differential amplifier. The device 37 is a diode switch which may be obtained from the Collins Radio Group of Rockwell International under part number 622-0853-001.

OPERATION

For the operational explanation, both FIGS. 1 and 2 will be used. When a signal is received which has a high signal-to-noise ratio, the appearance of the signals comprising noise, which in general are far outside the operational frequency of the receiver, do not hinder the operation because of the relative amplitudes. However, as the signal strength decreases, the signal-to-noise ratio decreases, thereby making the noise a larger relative factor in attempting to detect the desired signal. At some point, the receiver can no longer properly and accurately detect signals especially if these signals are digital signals. At some point above this loss of accurate detection, the AGC signal appearing on lead 18 is of a small enough value such that the switch 37 is actuated to insert filter 55. Filter 55 reduces the effective amplitude of signals outside the desired frequency range from reaching the I.F. amplifier 22. While undesirable phase shifts are inserted into the signal through the use of filter 55, under these conditions it is better to have the undesirable phase shift and have some detectable signal appear at the output of the receiver than to have no accurate signal at all. The signal amplitude detection circuitry comprising a portion of amplifier 41 has a built-in hysteresis so that the filter 55 will be switched in at one level but will not be switched out until the received signal as applied to mixer 12 is increased substantially above that value at which the filter 55 was first switched into the circuit. Thus, jitter in the signals is not a problem.

While I have provided a detailed description of the preferred embodiment of my inventive concept, I do not wish to be limited thereto and wish to state that there are many variations which will occur to those skilled in the art and thus I wish to be limited only by the scope of the appended claims, wherein I claim:

1. Apparatus for extending the received signal threshold level of operation of a radio receiver incorporating AGC circuitry comprising the addition of a switching circuit connected in series with the detection circuitry of the receiver and the switching circuit comprises, in combination:

first means for receiving a signal to be transmitted therethrough;

second means for supplying a received signal amplitude responsive control signal;

signal delay means;

bandpass filter means;

switch means connected to said first means, said second means, said signal delay means and said bandpass filter means for normally passing the signal received from said first means to said signal delay means and in the alternative passing the signal received from said first means to said bandpass filter means when a control signal is supplied by said second means; and third means connected to said signal delay means and said filter means for outputting a delayed version of the signal originally received by said first means.

2. Apparatus as claimed in claim 1 wherein:

said second means receives an AGC signal and supplies said control signal when said AGC signal is less than a predetermined value.

3. Apparatus as claimed in claim 1 wherein:

said signal delay means comprises a length of cable whereby the delay in said delay means is substantially identical to that in said filter means.

4. A radio receiver for use in a scatter detection system comprising, in combination:

antenna means;

intermediate frequency means including AGC for supplying a control signal to adjust the gain of said intermediate frequency means;

switch means connecting said antenna means to said intermediate frequency means and connected to receive the AGC control signal, said switch means normally supplying an intermediate frequency version of the signal received by said antenna means until the AGC control signal is less than a predetermined value and supplying a narrow bandpass filtered intermediate frequency version of the signal received by said antenna means while the AGC control signal is less than the predetermined value; and further detection and amplifying means, connected to receive signals from said intermediate frequency means for further modifying the signals received by said antenna means in accordance with the detection system specifications.

* * * * *